US011506358B2

(12) United States Patent
Chen et al.

(10) Patent No.: US 11,506,358 B2
(45) Date of Patent: Nov. 22, 2022

(54) OPTICAL ELEMENT, OPTICAL MODULE, AND VEHICLE

(71) Applicant: VALEO VISION, Bobigny (FR)

(72) Inventors: Fei Chen, Wuhan (CN); Brant Potter, Seymour, IN (US); Lu Bai, Wuhan (CN); John Orisich, Seymour, IN (US); Ambroise Servantie, Seymour, IN (US); Rong Zhou, Wuhan (CN); Lei Fan, Wuhan (CN)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/279,991

(22) PCT Filed: Sep. 27, 2019

(86) PCT No.: PCT/EP2019/076128
§ 371 (c)(1),
(2) Date: Mar. 25, 2021

(87) PCT Pub. No.: WO2020/064978
PCT Pub. Date: Apr. 2, 2020

(65) Prior Publication Data
US 2022/0034470 A1 Feb. 3, 2022

(30) Foreign Application Priority Data

Sep. 27, 2018 (CN) .......................... 201811132222.3

(51) Int. Cl.
*F21S 41/663* (2018.01)
*F21S 41/365* (2018.01)
(Continued)

(52) U.S. Cl.
CPC ........... *F21S 41/663* (2018.01); *F21S 41/143* (2018.01); *F21S 41/365* (2018.01); *F21W 2102/135* (2018.01)

(58) Field of Classification Search
CPC ...... F21S 41/663; F21S 41/365; F21S 41/143; F21S 41/27; F21S 41/24; F21S 41/322; F21W 2102/135
See application file for complete search history.

(56) References Cited

U.S. PATENT DOCUMENTS

2006/0126353 A1  6/2006  Ishida
2010/0135036 A1*  6/2010  Matsuba ............... F21S 41/322
                                                  362/516
(Continued)

FOREIGN PATENT DOCUMENTS

CN  108139059 A  *  6/2018  ............ F21S 41/143
CN  110953551 A     4/2020
(Continued)

OTHER PUBLICATIONS

International Search Report dated Nov. 18, 2019 in PCT/EP2019/076128 filed on Sep. 27, 2019, citing documents AA-AD and AO-AT therein, 5 pages.
(Continued)

*Primary Examiner* — Erin Kryukova
(74) *Attorney, Agent, or Firm* — Oblon, McClelland, Maier & Neustadt, L.L.P.

(57) ABSTRACT

The present invention relates to an optical element (1), an optical module and a vehicle. The optical element (1) comprises: a light incident section (10) for receiving light directly from a light source; a light exit section (30) having a focal plane (P); and a third section (20) that directs light from the light incident section (10) toward the light exit section (30) in a predetermined manner to generate a predetermined low beam distribution or high beam distribution, where the optical element (1) is implemented integrally.

17 Claims, 10 Drawing Sheets

(51) Int. Cl.
*F21S 41/143* (2018.01)
*F21W 102/135* (2018.01)

(56) References Cited

U.S. PATENT DOCUMENTS

| | | | |
|---|---|---|---|
| 2014/0362596 A1 | 12/2014 | Nakaya | |
| 2017/0038023 A1* | 2/2017 | Gromfeld | F21S 41/365 |
| 2017/0130923 A1* | 5/2017 | Nishimura | F21S 41/265 |
| 2019/0316749 A1 | 10/2019 | Zorn | |

FOREIGN PATENT DOCUMENTS

| | | | |
|---|---|---|---|
| DE | 10 2008 049 168 A1 | 4/2010 | |
| DE | 2 818 792 A2 | 12/2014 | |
| EP | 3 173 687 A1 | 5/2017 | |
| JP | 2010-170836 A | 8/2010 | |
| JP | 2017-228452 A | 12/2017 | |
| WO | WO-2017185118 A1 * | 11/2017 | F21S 41/143 |
| WO | WO 2018/094431 A1 | 5/2018 | |

OTHER PUBLICATIONS

Chinese Office Action dated Sep. 14, 2022 in Chinese Application No. 201980062852.4, with English Summary translation, 13 pgs.

* cited by examiner

OPTICAL ELEMENT, OPTICAL MODULE, AND VEHICLE

TECHNICAL FIELD

The present invention relates to an optical element, an optical module and a vehicle.

BACKGROUND

Vehicles, particularly motor vehicles, are equipped with headlights for illuminating the road ahead of the vehicle in low visibility or at night. These headlights are primarily used to generate two types of illumination modes, namely, a low beam mode and a high beam mode. In the low beam mode, the beam has a very sharp cut-off edge for providing illumination without disturbing other road participants. In the high beam mode, it is possible to illuminate a farther distance in front of the vehicle. These two modes can be switched manually or automatically depending on the actual situation.

DE 10 2006 042 749 discloses a lighting device for a vehicle headlight, which comprises an LED light source and an elliptical mirror having two focal points in a half space. The LED light source is placed at a first focal point of the mirror, close to the mirror. Light emitted from the LED light source is reflected by the mirror toward a second focal point, and a reflective surface, referred to as a deflector, is positioned at the second focal point. The reflective surface comprises edges positioned on the side facing toward the mirror and the side facing away from the mirror. These edges are called "cut-off edges." A portion of the beam reflected by the mirror shines onto the reflective surface and is reflected therefrom. The other portion of the beam passes through one or more of the cut-off edges and is not deflected by the reflective surface. Thus, the cut-off edge defines the boundary between the portion of the beam that is reflected and thus deflected and the portion that is not reflected. A lens is positioned behind the reflective surface and has a focal point corresponding to the second focal point of the elliptical mirror. Since the reflective surface having the cut-off edge "deflects" a portion of the beam to form a cut-off edge of the beam emitted by the lens, the reflective surface is referred to as a deflector. The deflector is movable along an axis parallel to the optical axis of the mirror. This mobility makes it possible to provide a high beam function and a low beam function. The vehicle headlight requires modules with high precision, and thus manufacturing costs are high.

Furthermore, there is a need in the technical field of motor vehicles to illuminate the road ahead of the vehicle in a "partial road illumination mode," i.e., to generate one or more dark areas in the high beam to avoid dazzling other road participants, especially drivers while illuminating as many roads as possible. This function is called an Adaptive Driving Beam (ADB) function, which is intended to automatically detect road participants that are easily interfered by the illumination beam emitted by the headlights in the high beam mode, and change the profile of the illumination beam to create a shadow area at the location of the detected road participant. ADB function can lead to, for example, improved user comfort, better visibility relative to low beam mode, and safer driving conditions.

SUMMARY

Accordingly, it is an object of the present invention to provide an optical element, an optical module having the optical element, and a vehicle. By means of the optical element, a predetermined light distribution can be generated in a particularly compact structure, and low manufacturing and assembly costs can be achieved.

To this end, the present invention proposes an optical element, in particular for a vehicle headlight, comprising: a light incident section for receiving light directly from a light source, such as light from a light source assembly of a vehicle headlight; a light exit section having a focal plane; and a third section that directs light from the light incident section toward the light exit section in a predetermined manner to generate a predetermined low beam distribution or high beam distribution, wherein the optical element is an integrated assembly. By such an optical element implemented integrally, it only needs to position the optical element at a predetermined location relative to the light source to generate the desired low beam and high beam distribution, thereby making the installation simple. Here, for the light incident section that directly receives light, its light incident surface may adopt any structure known at present. For example, the light incident surface may have a centered protrusion toward the light source and an annular conical surface disposed at the periphery of the protrusion. The annular conical surface has a tapered opening toward the light source.

According to an embodiment of the present invention, the third section may be arranged between the light incident section and the light exit section.

According to an embodiment of the present invention, the third section has a recess, of which the surface correspondingly forms a first light-refractive surface facing toward the light incident section, a second light-refractive surface facing toward the light exit section, and a light-reflective surface between the first light-refractive surface and the second light-refractive surface, wherein a focal plane of at least a portion of the first light-refractive surface at least approximately coincides with the focal plane of the light exit section. Here, the light-reflective surface can be subjected to a coating treatment, for example, coated with a metal reflective layer such as an aluminum layer. At least one of the first light-refractive surface and the second light-refractive surface may be subjected to an anti-reflection treatment, for example, provided with an anti-reflection film. This further enhances light utilization.

The leading edge of the light-reflective surface has a curved profile for forming the cutoff line. In this case, for example, there is in particular a stepped shape roughly in the middle of the cut-off edge.

According to an embodiment of the present invention, the recess is formed into the optical element.

The light incident section has a first light incident region and a second light incident region, the first light incident region and the second light incident region each has at least one light incident portion and are arranged in different rows for distribution to the light sources that generate different light distributions.

According to an embodiment of the present invention, the first light incident region and the second light incident region are arranged one above another.

According to an embodiment of the present invention, the light incident section has a first light incident region and a second light incident region which are staggered above and below at the edge of the recess facing toward and away from the light exit section.

According to an embodiment of the present invention each of said first and second light incident regions consists of a single light incident portion, each corresponding to a single light source.

According to an embodiment of the present invention, the optical element has a sub-region for generating a third light distribution. Here, the sub-region may be arranged in at least one of the light incident section, the light exit section, and the third section. For example, the sub-region is arranged at a lower portion of the corresponding light-reflective surface of the first light incident section, or at the first light-refractive surface of the third section, or at a relevant portion of the light exit surface of the light exit section where a microstructural processing has been performed. Thereby, for example, the third light distribution for illuminating a signboard is generated, and the light for generating the third light distribution propagates below the focal point of the light exit surface of the light exit section at the focal plane.

The optical element is made of a light-guide material, in particular made of polycarbonate PC, polymethyl methacrylate PMMA, silicone, silica gel or glass.

The present invention also proposes an optical module, in particular a vehicle headlight, comprising a light source assembly and an optical element as described above, the light source assembly being assigned to the light incident portions of the optical element. The light source assembly comprises, for example, a first source combination for generating a low beam distribution and a second source combination for generating a high beam distribution.

The optical module further comprises a control device capable of selectively triggering the light source assembly.

The light incident section has a first light incident region and a second light incident region, and the light source assembly comprises a first light source combination and a second light source combination respectively assigned to the first light incident region and the second light incident region to generate low beam distribution and high beam distribution.

Here, the control device controls different light source combinations of the light source assembly to generate low beam distribution or high beam distribution, or controls individual light sources of the same light source combination, e.g., individual light sources of the second light source combination for generating high beam distribution, to generate a matrix beam, thereby forming a dark region when needed.

In addition, the optical module further comprises a system for detecting other road participants and transmitting the detected relevant information to the control device to adjust the light source assembly accordingly, thereby preventing adverse effects on other participants. For example, the light sources of the light source combination for generating high beam distribution can be selectively turned off.

The light source assembly can be arranged on a common holder, such as a PCB board. The light source assembly, of course, can also be arranged directly on a heat sink. Here, "arranged directly" means that the light source assembly is arranged on a heat sink without a PCB board.

The light sources for generating low beam distribution and high beam distribution may also be arranged on their own holders as needed.

The present invention further proposes a vehicle having the optical element described above or the optical module described above.

BRIEF DESCRIPTION OF THE DRAWINGS

The present invention is further described below with the aid of the drawings. wherein.

DETAILED DESCRIPTION

Embodiments of the present invention are exemplarily illustrated below. As understood by those skilled in the art, the described embodiments may be modified in different ways without departing from the inventive concept of the present invention. Accordingly, the drawings and description are essentially illustrative rather than restrictive. Hereinafter, the same reference numerals denote elements having the same or similar functions.

Figure 1:
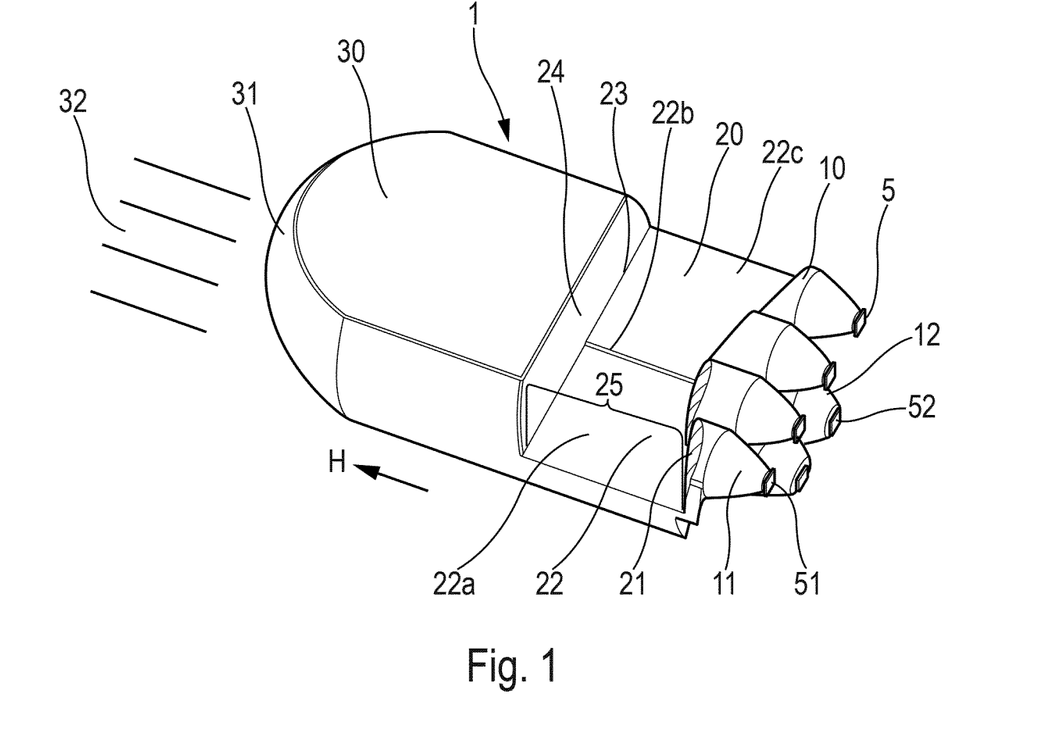
FIG. 1 schematically illustrates a perspective view of a first embodiment of the optical element according to the present invention, wherein the optical element is provided with a light source assembly.
Figure 2:
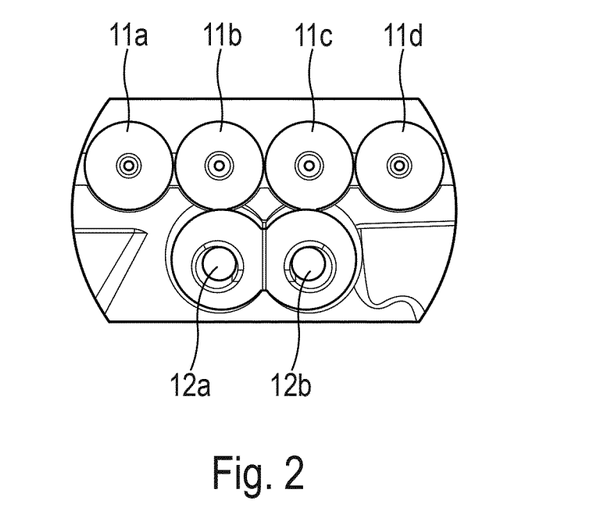
FIG. 2 illustrates a rear view of the optical element of FIG. 1.
Figure 3:
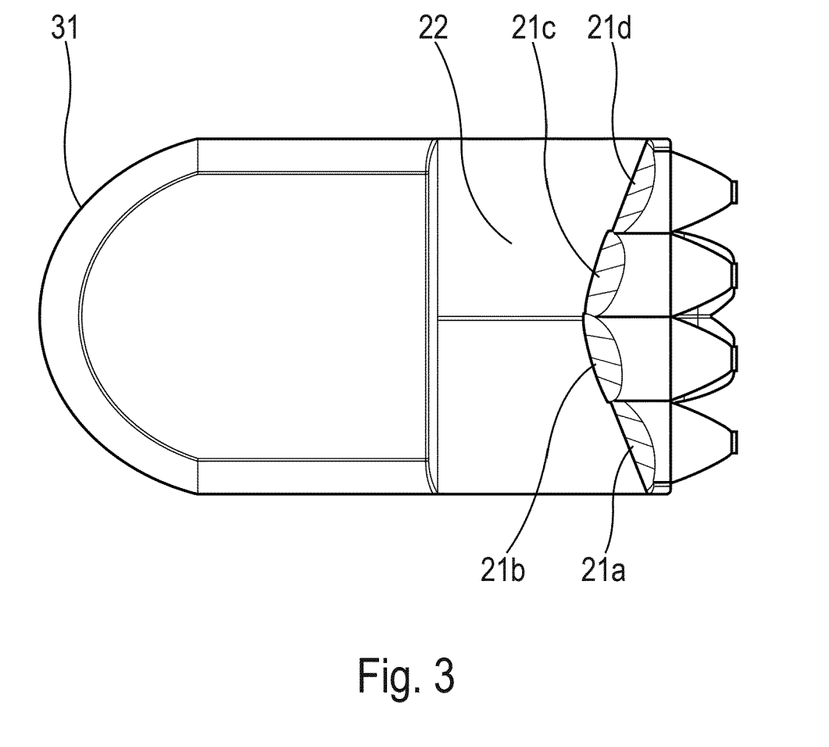
FIG. 3 illustrates a top view of the optical element of FIG. 1.
Figure 4:
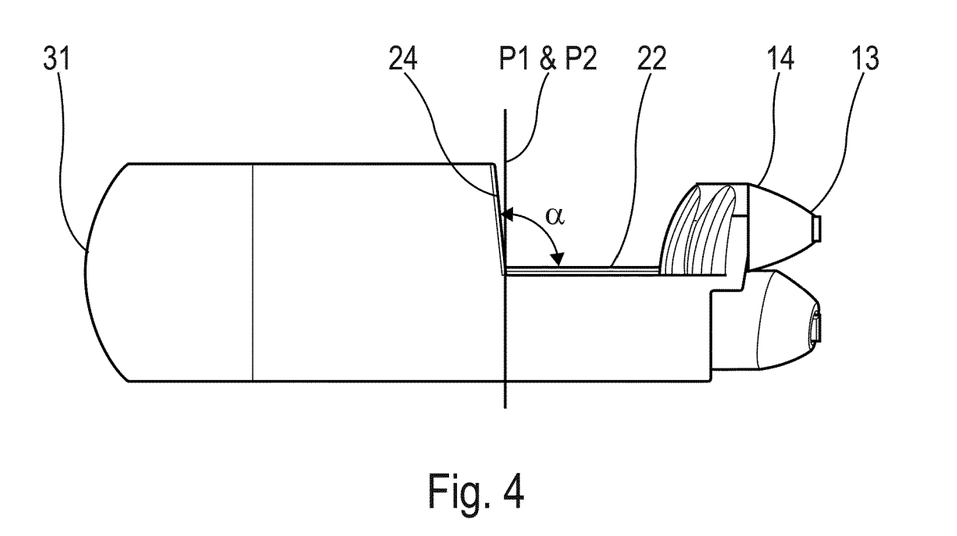
FIG. 4 illustrates a side view of the optical element of FIG. 1.

FIG. 1 schematically illustrates a perspective view of a first embodiment of an optical element 1 according to the present invention. FIGS. 2 to 4 respectively illustrate rear view, top view and side view of the optical element.

Here, the optical element 1 comprises: a light incident section 10 for directly receiving light from a light source assembly 5, for example, of a vehicle headlight; a light exit section 30 having a focal plane P2 which will be described below; a third section 20, here arranged between the light incident section 10 and the light exit section 30, and directing light from the light incident section 10 toward the light exit section 30 in a predetermined manner to generate a predetermined light distribution, such as low beam distribution or high beam distribution. Here, the optical element 1 is implemented integrally and made of, for example, PC (polycarbonate), PMMA (polymethyl methacrylate), silicone, silica gel, glass, or other suitable light guide materials. This reduces the number of parts and therefore reduces manufacturing costs.

As shown in FIG. 1, the light incident section 10 has a first light incident region 11 and a second light incident region 12. For example, the first light incident region 11 is assigned to a light source combination 51 for generating a low beam distribution, and the second light incident region 12 is assigned to a light source combination 52 for generating a high beam distribution. The first light incident region 11 and the second light incident region 12 are arranged one above another, and each has its own light incident portions. For example, the first light incident region 11 has light incident portions 11a, 11b, 11c and 11d, and the second light incident region 12 has light incident portions 12a and 12b. The corresponding light incident portions receive light from the light source assembly 5. The light incident portions of each of the light incident regions may be identically or differently configured to collimate and/or converge the incident light beam. The outer peripheral surface of the light incident portion is shown in FIG. 1 as a tapered surface. This is merely illustrative and it may be any other suitable shape.

The number of light incident portions of the first light incident region 11 and the second light incident region 12 can be arbitrarily selected as needed. The light incident portions of the respective light incident regions may be arranged in parallel with each other or at a predetermined angle.

For the light incident portion, as can be seen by combining FIGS. 4, 5a, 5b and 6a, 6b, it comprises at least a light incident surface 13 and a reflective surface 14 adjacent to the light incident surface. The light incident surface has, for example, a centered protrusion facing the light source shown and an annular conical surface disposed around the protrusion. The annular conical surface has a tapered opening toward the light source. The reflective surface can also be a conical surface with a tapered opening facing away from the light source, thereby completing the collimation or convergence of the beams from the light source.

The light source assembly 5 can be arranged on a holder (not shown), such as a printed circuit board. The holder arranged with the light source assembly 5 can be placed directly on a heat sink to achieve dissipation of the generated heat, thereby lowering the temperature of the light source assembly.

Alternatively, the light source assembly 5 can be arranged directly on the heat sink (described but not shown). This further facilitates the dissipation of heat generated by the light source assembly.

The individual light sources of the light source assembly can be any conventionally suitable light sources, e.g., light emitting diodes such as white light emitting diodes.

Provided on the end of the optical element 1 opposite the light incident section 10 is a light exit section 30 having a light exit surface 31. The light exit surface 31 shapes the light that reaches it and projects the shaped beam 32, such as low beam or high beam, toward the front of the optical element. For this purpose, the light exit surface 31 can be spherical or aspherical for example, and has a focal plane P2.

The third section 20 arranged between the light incident section 10 and the light exit section 30 of the optical element 1 has a recess 25 provided in the optical element 1. The recess penetrates the optical element 1 in a direction transverse to the light exit direction, thereby opening upward as shown in the side view of FIG. 4. The third section 20 has a first light-refractive surface 21 facing toward the light incident section 10, a second light-refractive surface 24 facing toward the light exit section 30, and a light-reflective surface 22 arranged therebetween. The second light-refractive surface 24 and the light-reflective surface 22 intersect at the intersection line 23. The intersection line forms a cut-off edge 23 of the low beam, which will be described below in detail.

The first light-refractive surface 21 may have sub-refractive surfaces 21a, 21b, 21c and 21d corresponding to the light incident portions 11a, 11b, 11c and 11d of the first light incident region 11, which may continuously transition with each other or be offset along the primary propagation direction of light H. For example, the sub-refractive surfaces 21b, 21c are continuous curved surfaces of which the focal points at least substantially coincide with the focal point of the light exit surface 31, and the sub-refractive surfaces 21a, 21d are offset from the sub-refractive surfaces 21b, 21c.

The sub-refractive surfaces of the first light-refractive surface 21, of course, can be adjusted accordingly as needed. The sub-refractive surface itself may be a continuous curved surface or composed of a plurality of patches.

The light-reflective surface 22 comprises a first sub-light-reflective surface 22a, a second sub-light-reflective surface 22b, and a third sub-light-reflective surface 22c in a direction transverse to the longitudinal extending direction of the optical element 1, wherein the second sub-light-reflective surface 22b transitionally connect the first sub-light-reflective surface 22a and the third sub-light-reflective surface 22c which are not in the same plane. The intersection line at 23 of the above-described three sub-light-reflective surfaces and the second light-refractive surface 24 is in the focal plane P2 of the light exit surface 31 of the light exit section 30 to form the cut-off edge of low beam distribution. Thereby, the intersection line forms a cut-off edge 23 and has a curved profile. The cut-off edge 23 can have, in particular a stepped shape in the middle. Here, the second sub-light-reflective surface 22b may be, for example, inclined by a predetermined angle, e.g., 15°, 30°, 45°, or any other suitable angle, with respect to the first sub-light-reflective surface 22a and the third sub-light-reflective surface 22c.

Of course, in order to form a cut-off edge for low beam distribution that meets the requirements of national laws and regulations, the shape of the above-mentioned sub-light-reflective surface can be correspondingly modified as needed.

The light-reflective surface 22 may be subjected to a coating treatment, for example, applied with a metal coating such as an aluminum plating layer.

The second light-refractive surface 24 adjacent to the light-reflective surface 22 is at a predetermined angle α with respect to the light-reflective surface 22. As can be seen in the front view of FIG. 4, the second light-refractive surface 24 is inclined toward the direction of the light exit section 30 with respect to the focal plane P1, whereby the angle of α is greater than 90°, which is particularly advantageous for demolding.

Figure 5A:
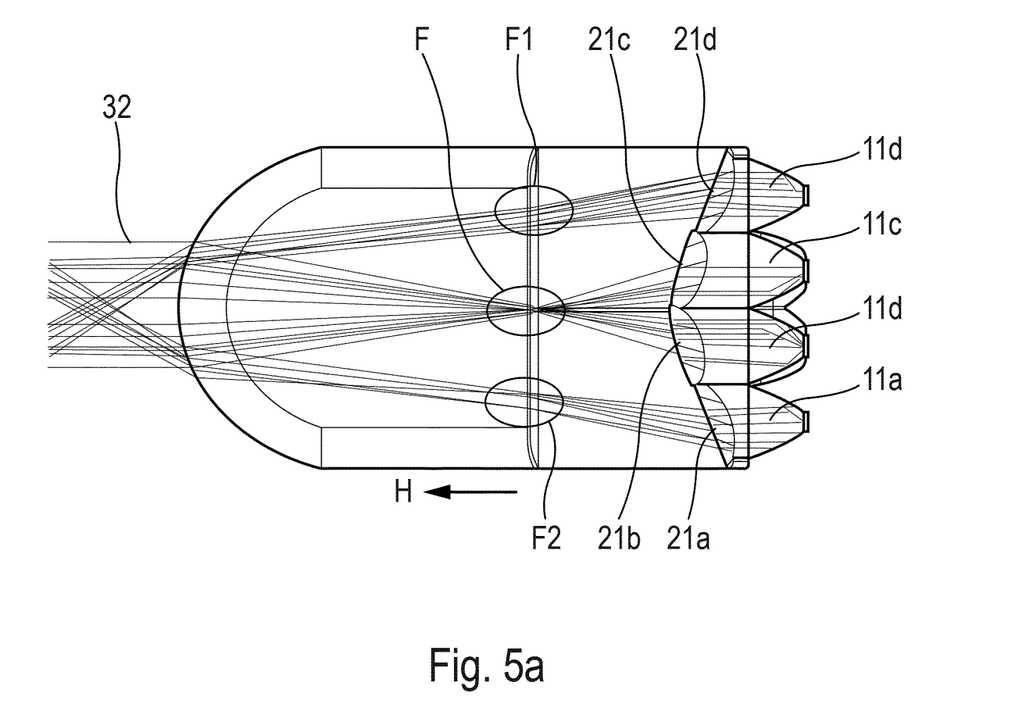
FIGS. 5a and 5b illustrate an optical path of a low beam channel in the optical element of FIG. 1.
Figure 5B:
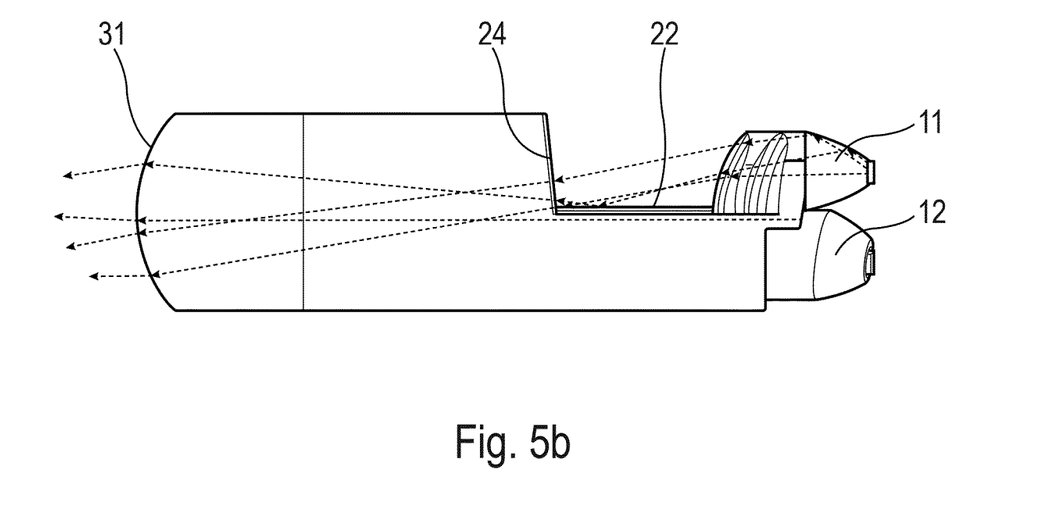
Figure 6A:
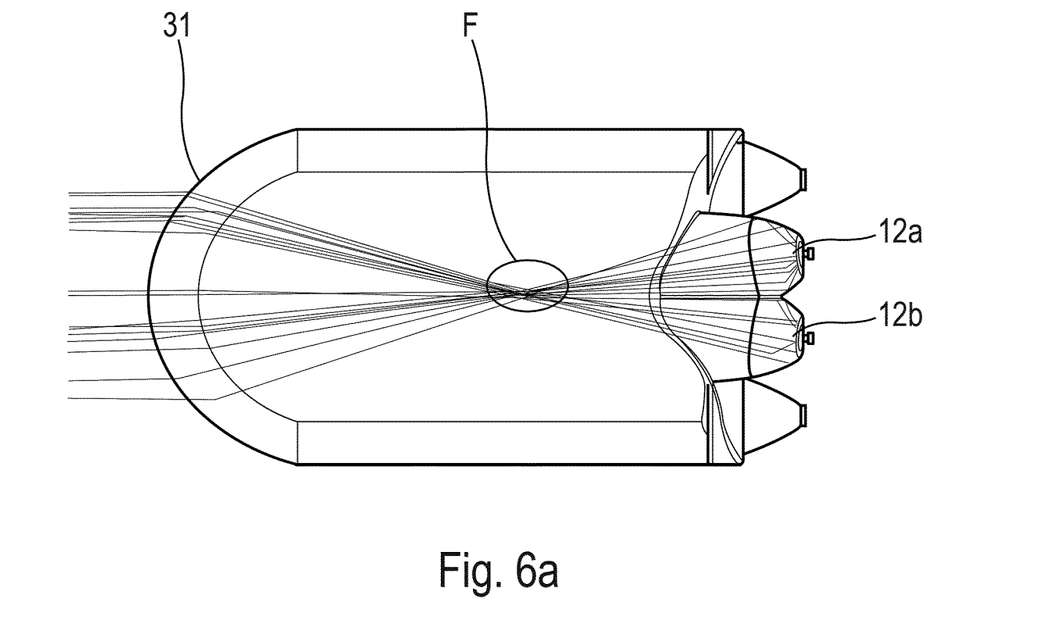
FIGS. 6a and 6b illustrate an optical path of a high beam channel in the optical element of FIG. 1.
Figure 6B:
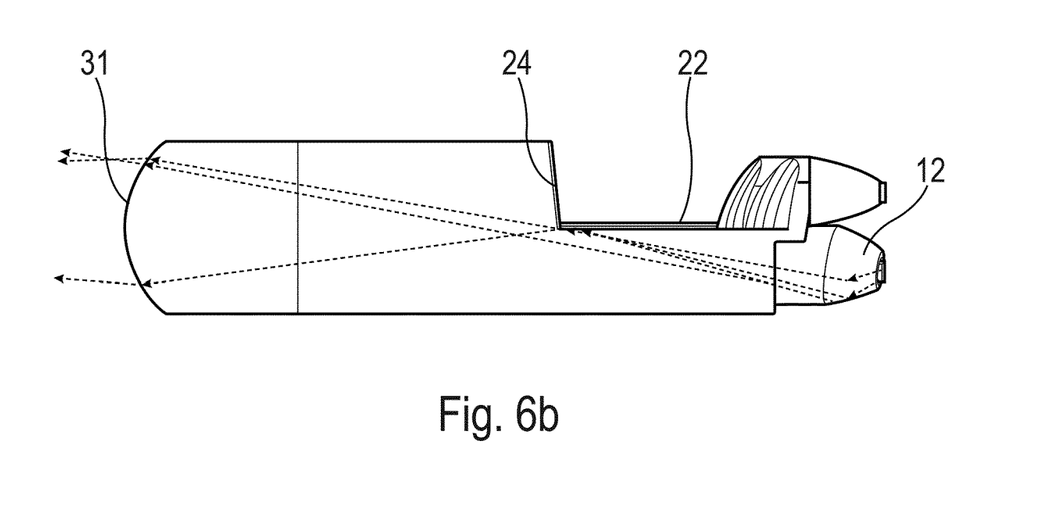

The operation mode of the optical element is now schematically described in combination with FIGS. 5a, 5b and 6a, 6b, wherein FIGS. 5a and 5b illustrate the optical path of the low beam channel in the optical element, and FIGS. 6a and 6b illustrate the optical path of the high beam channel in the optical element. The light propagates in the optical element along the primary propagation direction H shown only by arrows in the lower portion of FIG. 1 and FIG. 5a.

In FIGS. 5a and 5b, the light from the light source combination 51 passes through the light incident portion of the first light incident region 11 and reaches the light-reflective portion thereof. The light is reflected in the direction toward the first light-refractive surface 21 in the light-reflective portion, for example, reflected via collimation or convergence in the direction toward the first light-refractive surface 21. At least a portion of the light is refracted at the first light-refractive surface 21 and propagates toward the focal plane P1, wherein a portion of the light reaches the intermediate focus region F and the other portion reaches the focus regions F1, F2 on both sides. In other words, after being refracted by the first light-refractive surface 21, the light is primarily divided into three light beams, some of which reach the vicinity of the focus region F of the light exit surface 31, and the other of which reach both sides of the focus region F. Here, it should be noted that the number of primary light beams split by the light after being refracted by the first light-refractive surface 21 can be selected as needed, thereby correspondingly matching the sub-refractive surfaces of the light incident portion.

As can be seen from the typical rays shown by the dashed line in FIG. 5b, a portion of the light rays reaching the focal plane P1 directly reaches the light-reflective surface 22, a portion reaches the intersection line 23, and the remaining portion reaches the second light-refractive surface 24, wherein the light rays reaching the intersection line 23 directly enter the light exit section 30, and the light rays reaching the light-reflective surface 22 is reflected toward the second light-refractive surface 24, and the light reaching the second light-refractive surface 24 is refracted here and then enters the light exit section 30. Finally, all of the light rays exit via the light exit surface 31, wherein the light beam reaching the intermediate focus region F is adjusted to be substantially parallel to the primary propagation direction H, and the other exit light beams have a predetermined angle with respect to the primary propagation direction H, thereby achieving the specified light exit width to meet the light exit requirements of low beam distribution.

As can be seen in FIGS. 6a and 6b, light from the light source combination 52 passes through the light incident portions of the second light incident region 12 and reaches the light-reflective portion thereof. The light is reflected in the direction toward the light exit surface 31 in the light-reflective portion, for example, reflected via collimation or convergence in the direction toward the light exit surface 31. The reflected light is converged at the intermediate focus region F and continues to propagate to the light exit surface 31, wherein a portion of the light directly propagates to the light exit surface 31, and the other portion is reflected by the light-reflective surface 22 and then reaches the light exit surface 31. After the light is refracted by the light exit surface 31, a final desired light distribution, such as a high beam distribution, is generated.

FIG. 6b illustrates the course of typical rays for generating high beam distribution.

In addition, FIG. 5b also shows another light ray distribution with a double dot dash line that propagates below the light-reflective surface and is projected onto the region above the cut-off edge after leaving the light exit surface, thereby generating another light distribution difference from the low beam distribution to illuminate signboards, for example. For this reason, a separate region can be separated at the light incident portions 11a, 11b, 11c and 11d of the first light incident region 11, for example, at the lower portion of the light-reflective surface.

FIG. 7 to FIGS. 10a, 10b schematically illustrate the second embodiment of the optical element according to the present invention. Here, the optical element 1' also has a light incident section 10', a light exit section 30', and a third section 20' arranged between the light incident section 10' and the light exit section 30'. The light incident section 10' has a first light incident region 11' for generating a low beam distribution and a second light incident region 12' for generating a high beam distribution. The third section 20' has a first light-refractive surface 21', a light-reflective surface 22', and a second light-refractive surface 24'. The light exit section 30' has a light exit surface 31'. In the third section 20', also constructed is a cut-off edge 23' for creating a cut-off edge of low beam distribution, which has a curved profile and in particular has a stepped shape or other suitable shape in the middle. The cut-off edge 23' is in the focal plane P2 of the light exit surface 31', and the focal point of at least a portion of the first light-refractive surface 21' is also in the focal plane P1.

Figure 7:
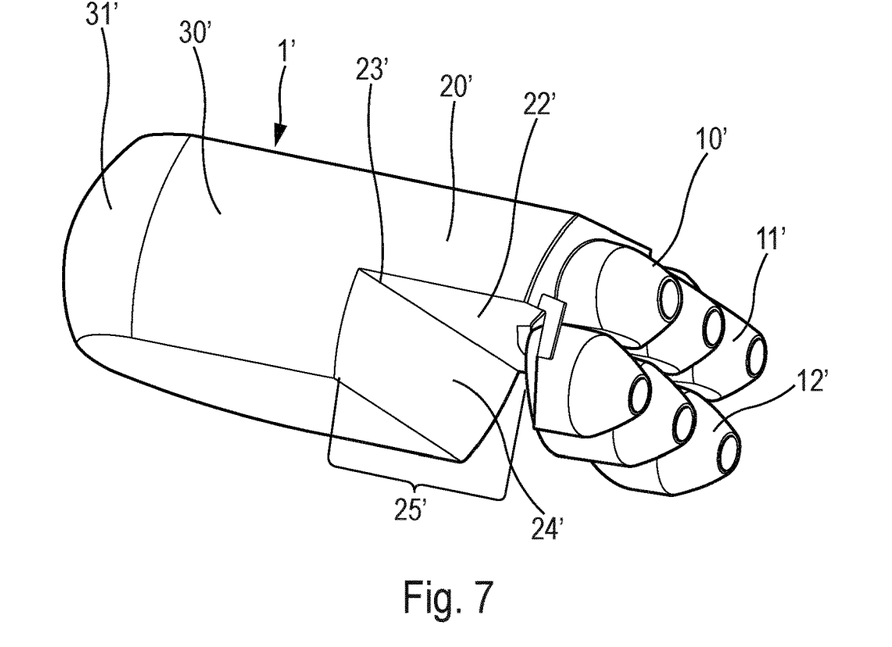
FIG. 7 schematically illustrates a perspective view of a second embodiment of the optical element according to the present invention.
Figure 8:
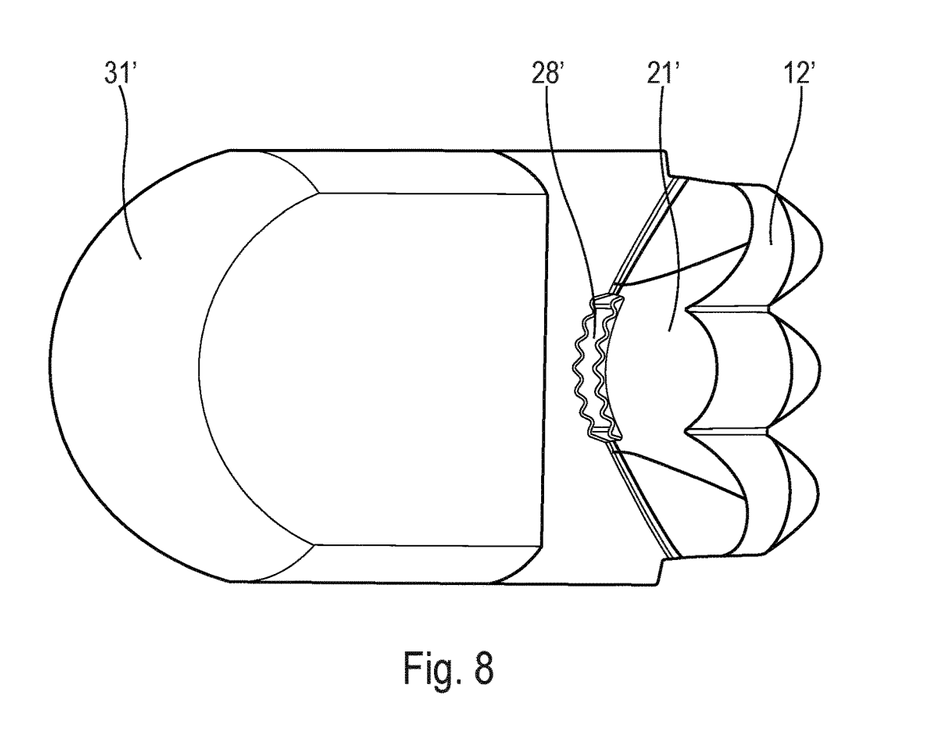
FIG. 8 illustrates a bottom view of the optical element of FIG. 7.

However, unlike the optical element 1 of the first embodiment, in the optical element 1' of the second embodiment, the recess 25' forming the third section 20' is arranged on one side of the second light incident region 12' assigned to the light source for generating high beam distribution. Furthermore, a region 28' is provided at the bottom of the recess 25' where the first light-refractive surface 21' is formed, for generating a third light distribution different from the low beam distribution and the high beam distribution, for example for illuminating signboards. The region 28' will be described below in detail.

The first light incident region 11' and the second light incident region 12' that are exemplarily shown each has three light incident portions. Each of the light incident portions is provided with a light source.

Figure 9:
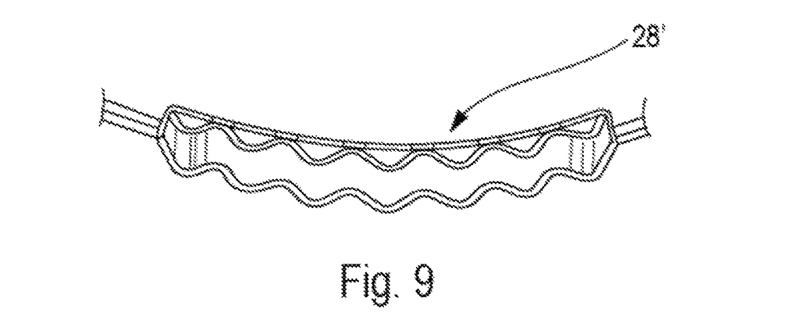
FIG. 9 illustrates a partially enlarged view of FIG. 8.

The region 28' is arranged in the middle of the first light-refractive surface 21' at the bottom of the recess 25', and its surface that faces the second light-refractive surface 24' has a light-processing structure to diffuse the light in a predetermined manner. Here, the region 28' has a wavy cross section. A portion of the light emitted by the light source assigned to the first light incident region 11' can reach the region 28' and propagate below the light-reflective surface 22' after transmitting through the region, and finally generate the light distribution above the cut-off edge of low beam distribution to illuminate the signboard.

Figure 10A:
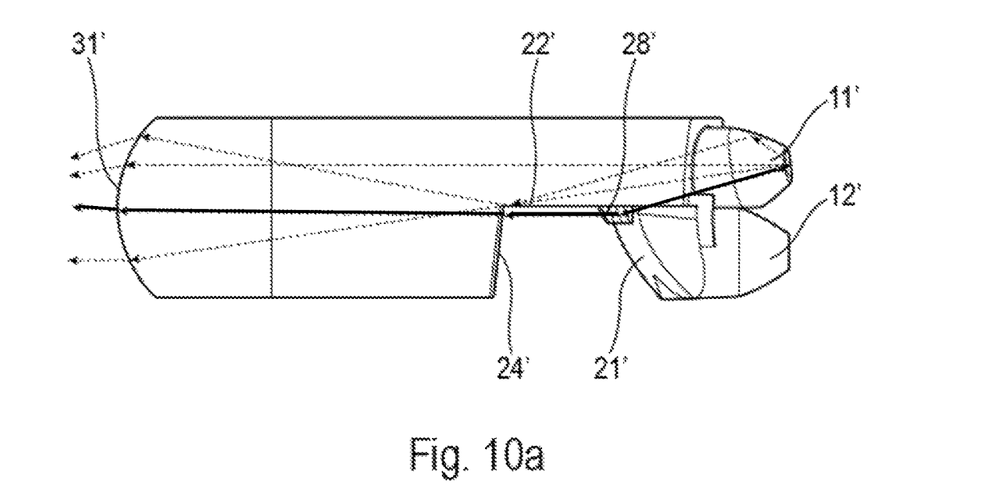
FIGS. 10a and 10b respectively illustrate, in a side view, the optical paths of the low beam channel and the high beam channel in the optical element of FIG. 7.
Figure 10B:
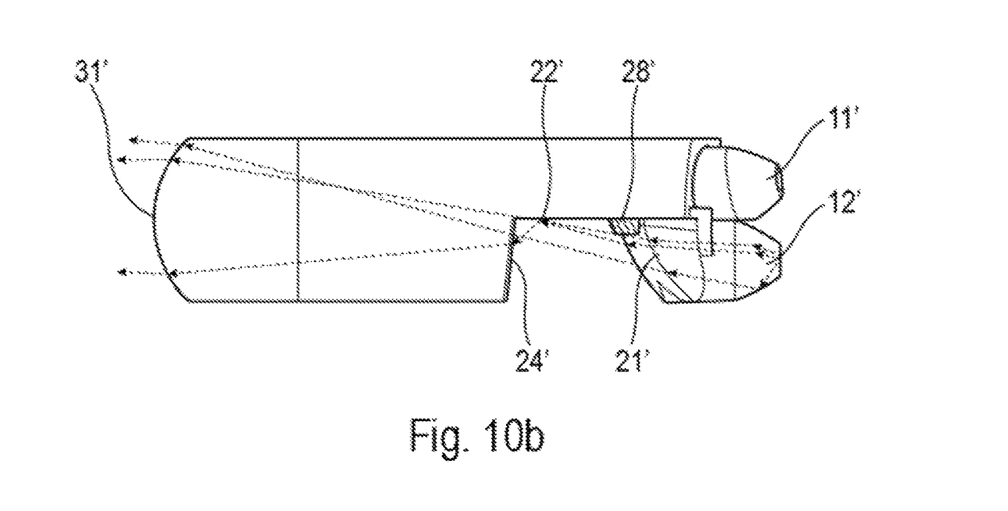

The light emitted by the light source has a course in the optical element 1' which is substantially similar to that in the optical element 1 of the first embodiment. For this, reference is made to the above description, in which FIG. 10a shows typical light rays for low beam distribution with dashed lines, and shows typical light rays for illuminating the signboard with a solid line, and FIG. 10b shows typical light rays for high beam distribution with dashed lines.

Figure 11:
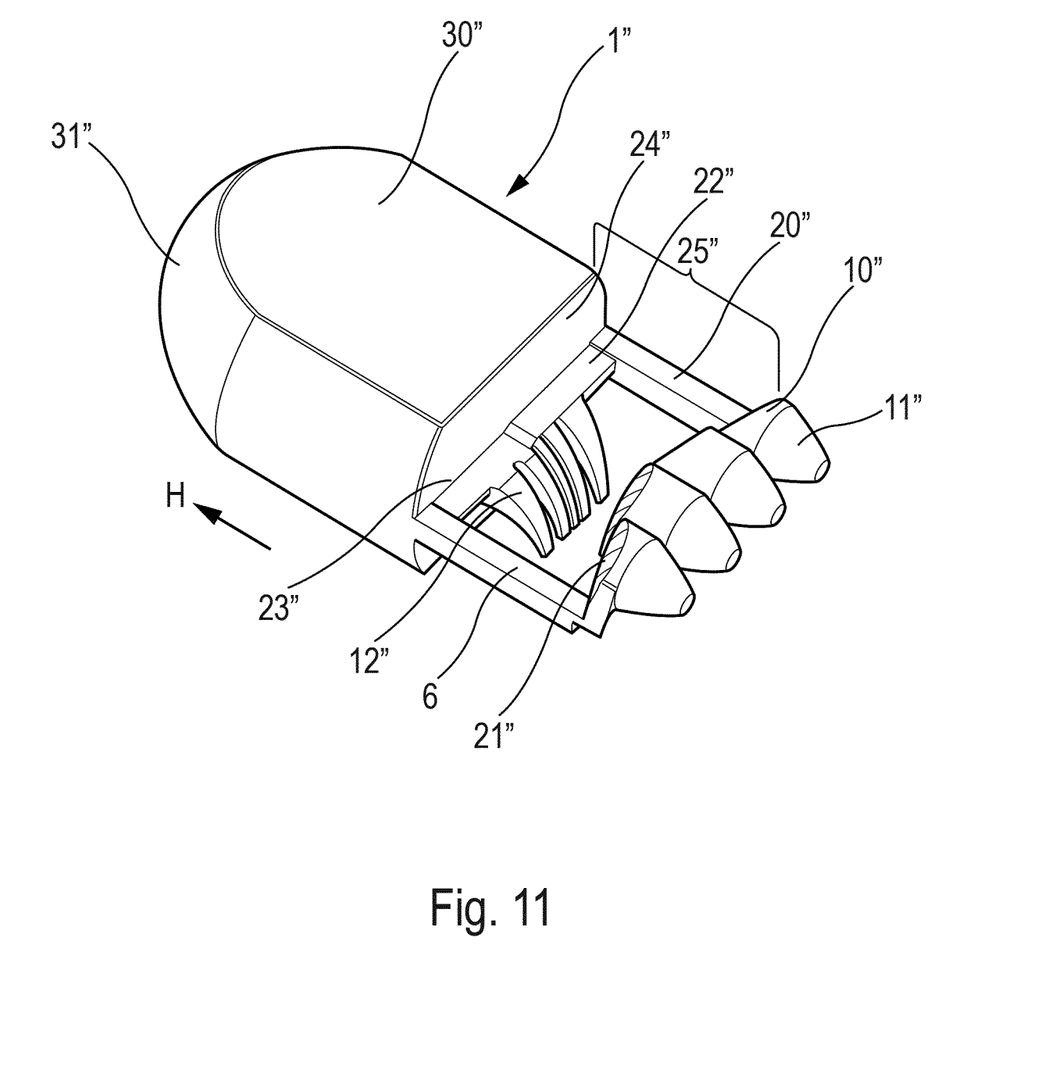
FIG. 11 schematically illustrates a perspective view of a third embodiment of the optical element according to the present invention.

FIG. 11 schematically illustrates a third embodiment of the optical element according to the present invention.

In this embodiment, the optical element 1" is also implemented integrally. Here, the third section 22" likewise has a first light-refractive surface 21", a light-reflective surface 22", a cut-off edge 23" for generating a cut-off edge of low beam distribution, and a second light-refractive surface 24". The light exit section 30" has a light exit surface 31". The cut-off edge 23' also has a curved profile and in particular has a stepped shape or other suitable shape in the middle. The cut-off edge 23' is in the focal plane P2 of the light exit surface 31", and the focal point of at least a portion of the first light-refractive surface 21" is also in the focal plane P1. The propagation of light in the optical element 1" is substantially similar to the embodiment described above.

Unlike the two embodiments mentioned above, the recess 25" forming the third section 22" of the optical element 1" partially penetrates the optical element 1", thereby forming a bridge 6. The first light incident region 11" and the second light incident region 12" of the light incident section are arranged one above another, but offset from each other in the primary propagation direction H on both sides of the bridge 6, that is, arranged on the edges of the recess 25" facing toward and away from the light exit section.

Further, the light incident portion of the second light incident region 12" is composed of light guides having a predetermined shape which are arranged side by side in the direction transverse to the primary propagation direction H. Each of the light guides has a light incident portion and a light exit portion to direct light from the light incident portion to the cut-off edge 23".

Here, all of the light guides can be arranged, for example, in a diffuse manner in the propagation direction of light H, i.e., the distance between the outer sides of the cross sections of the light guides on the outermost sides increases gradually in the propagation direction of light H. The light incident portions of the light guides can be joined together, whereas the light exit portions thereof are spaced apart from each other.

The side of the light guide between the light incident portion and the light exit portion is reflective.

Similar to the first embodiment, a region is also left in the lower portion of the light-reflective portion of the light incident portion of the first light incident region 11" for allowing the reflected light to propagate below the light-reflective surface 22" after leaving the first light-refractive surface, and finally generate the third light distribution different from low beam distribution and high beam distribution for illuminating the signboard.

Figure 12:
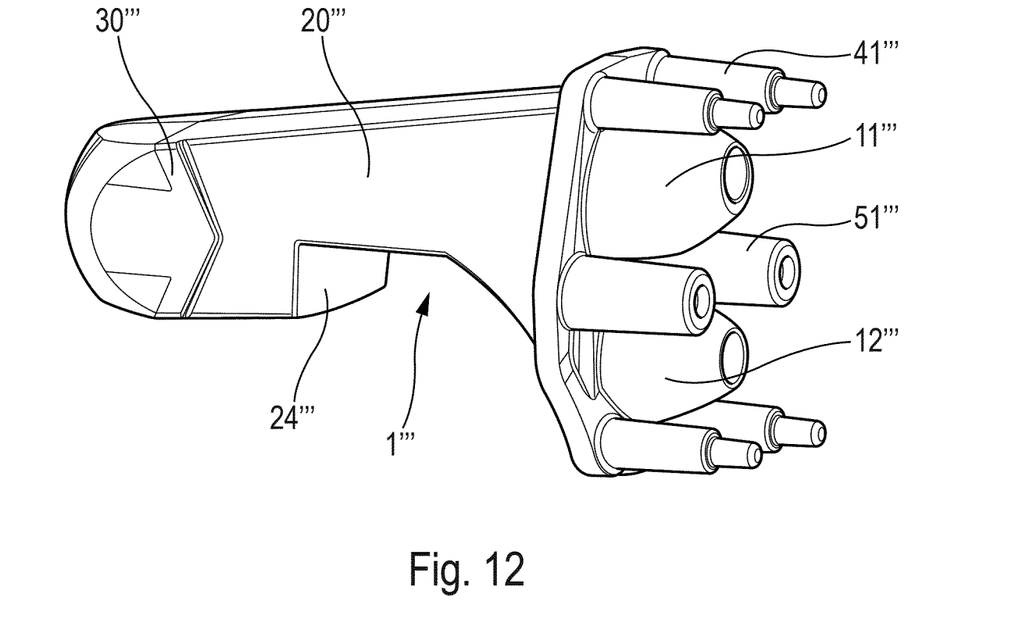
FIG. 12 schematically illustrates a perspective view of a fourth embodiment of the optical element according to the present invention.
Figure 13:
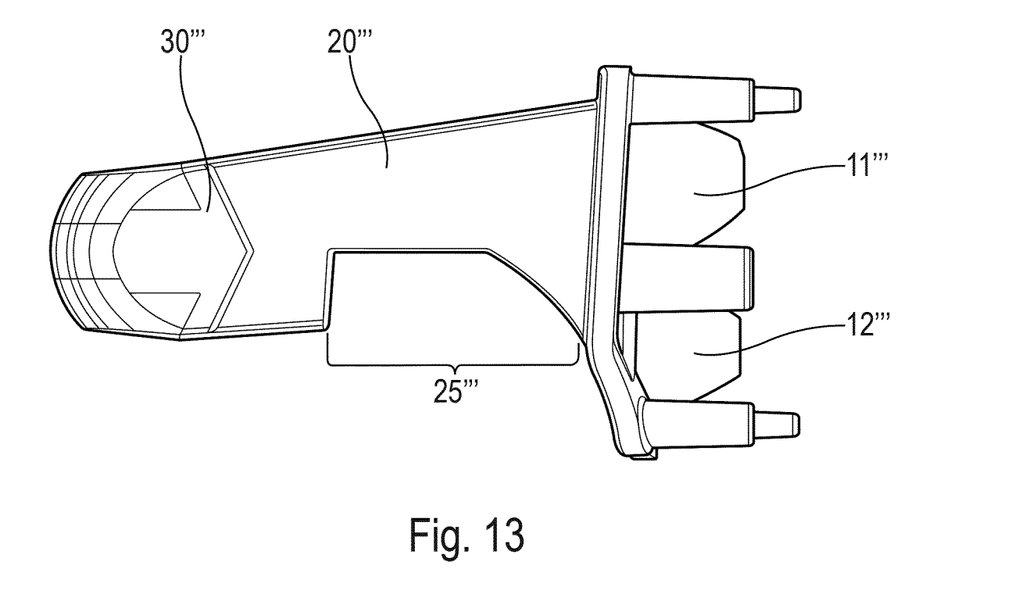
FIG. 13 illustrates a side view of the optical element of FIG. 12.
Figure 14:
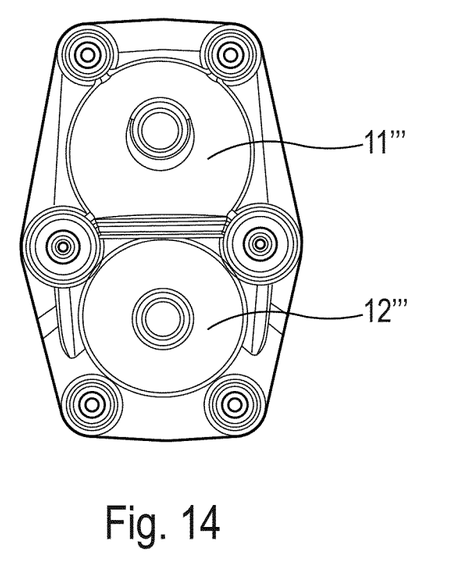
FIG. 14 illustrates a rear view of the optical element of FIG. 12.
Figure 15:
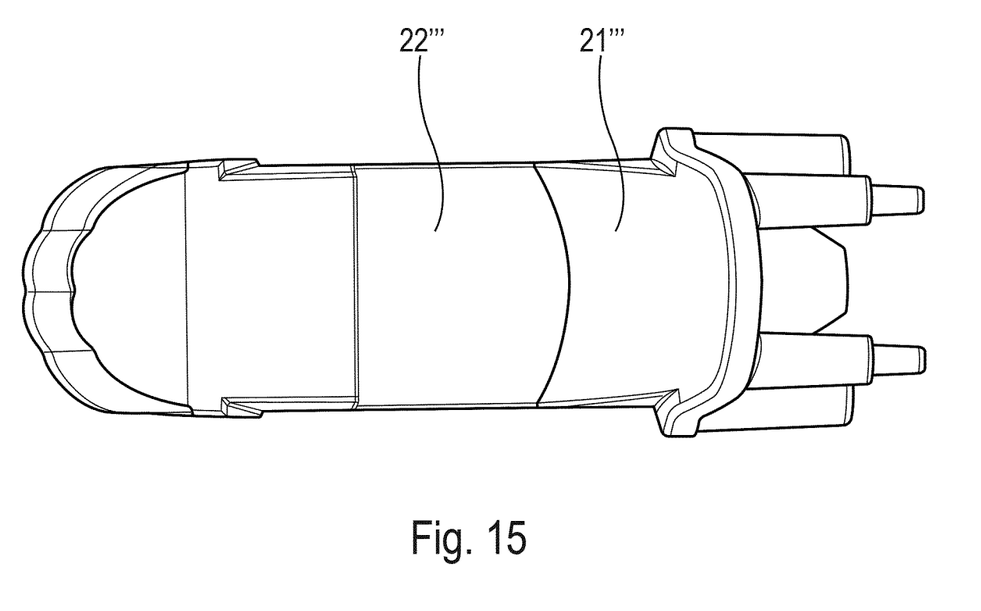
FIG. 15 illustrates a bottom view of the optical element of FIG. 12.

FIGS. 12 to 15 schematically illustrate the fourth embodiment of the optical element according to the present invention. Here, the optical element 1''' is a particular case of the second embodiment, where each of the first and second incident regions consists of a single incident portion, each corresponding to a single light source. Said fourth embodiment is similarly integrally implemented and offers a modular embodiment for the invention, allowing for any number of said optical elements to be stacked next to each other to produce different levels of illumination. In FIG. 12, element 41''' and element 51''' respectively depict the locator pin and the screw hole for the installation of the optical element on the PCB and the heat sink.

According to the present invention, since the second light incident region has a plurality of light incident portions, selective light beams can be generated by selectively triggering the light source assigned to the corresponding light incident portions. In particular, the beam is split into a plurality of portions that can be selectively turned on or off depending on the instructions for the light source sent by the controller. Thus, when it is detected that there are other vehicles or pedestrians in front of the vehicle, the light source corresponding to the relevant beam portion is turned off to form a non-glare region, while a good illumination state of the other regions is maintained.

It should be understood that the optical element described above can be made of any material suitable for light guide, such as polycarbonate PC, polymethyl methacrylate PMMA, silicone, silica gel or glass, and the like.

For an optical module, in particular a vehicle headlight comprising the optical element described above, in addition to the light sources, it further comprises a control device for turning on or off the light sources assigned to the light incident portions of the light incident region of the optical element, or for changing the luminous power of the corresponding light sources.

Figure 16:
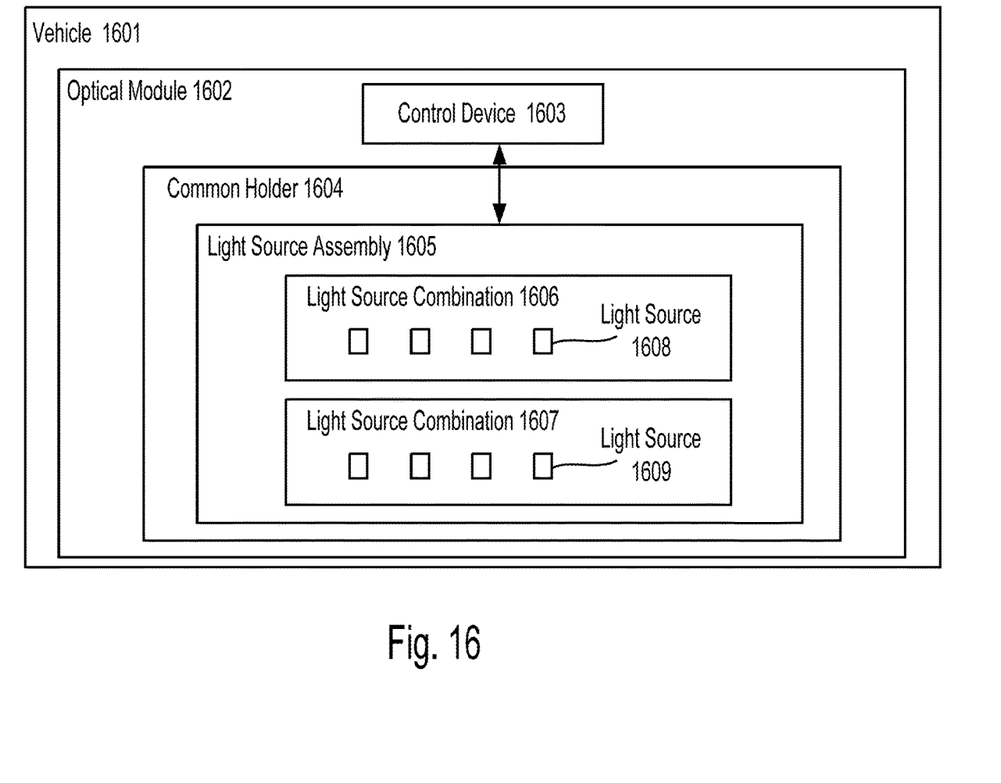
FIG. 16 shows an example of a vehicle.

The optical module may also comprise a module for detecting other road participants on the road (described but not shown). The module comprises, for example, a camera or sensor that detects a road scene in front of the vehicle, and comprises a corresponding processing device to allow generation of detection information. The module can send the detection information to the control device to turn on or off the light source or change the power of the light source. FIG. 16 shows an example of a vehicle 1601. The vehicle 1601 comprises the optical module and the optical element described above. For example, the vehicle 1601 can include an optical module 1602 as described above. The optical module 1602 can include a control device 1603 as described above and a light source assembly 1605 as described above. For example, the light source assembly 1605 can be arranged on a common holder 1604, such as a PCB board or a heat sink. The common source assembly 1605 can include a first light source combination 1606 and a second light source combination 1607. The first light source combination 1606 can include one or more light sources 1608. The second light source combination 1607 can include one or more light sources 1609. For example, the first light source combination 1606 and the second light source combination 1607 can be assigned to a first light incident region and a second light incident region, respectively, within a light incident section of an optical element (not shown) as described above. The light source assembly 1605 can operate under the control of the control device 1603. For example, the control device 1603 can separately control (turn on or turn off) the light sources 1608 and 1609.

The present invention is not limited to the above configuration, and various modifications may be employed. Although the present invention has been described by way of a limited number of embodiments, those skilled in the art may, with the benefit of the present disclosure, design other embodiments not apart from the scope of the present invention disclosed herein. Therefore, the scope of the present invention should be defined only by the claims.

The invention claimed is:
1. An optical element, comprising:
  a light incident section for receiving light directly from a light source;
  a light exit section having a focal plane; and
  a third section that directs light from the light incident section toward the light exit section in a predetermined manner to generate a predetermined low beam or high beam distribution,
  wherein the light incident section, the light exit section, and the third section are implemented integrally, and
  the third section has a recess, a surface of the recess correspondingly forming a first light-refractive surface facing the light incident section, a second light-refractive surface facing the light exit section, and a light-reflective surface between the first light-refractive surface and the second light-refractive surface, wherein a focal plane of at least a portion of the first light-refractive surface at least approximately coincides with the focal plane of the light exit section.

2. The optical element according to claim 1, wherein the third section is arranged between the light incident section and the light exit section.

3. The optical element according to claim 2, wherein the optical element has a sub-region for generating a light distribution different from the low beam distribution and the high beam distribution.

4. The optical element according to claim 3, wherein the sub-region is arranged in at least one of the light incident section, the light exit section and the third section.

5. The optical element according to claim 2, wherein the optical element is made of a light guide material made of polycarbonate, polymethyl methacrylate, silicone, silica gel or glass.

6. The optical element according to claim 1, wherein the recess penetrates the optical element in a direction transverse to a light exit direction.

7. The optical element according to claim 1, wherein the light incident section has a first light incident region and a second light incident region, the first light incident region and the second light incident region each has at least one light incident portion and are arranged in different rows.

8. The optical element according to claim 6, wherein the light incident section has a first light incident region and a second light incident region which are staggered above and below at an edge of the recess facing toward and away from the light exit section.

9. The optical element according to claim 7, wherein the first light incident region and the second light incident region are arranged one above another.

10. The optical element according to claim 7, wherein the first light incident region and the second light incident region each has one light incident portion.

11. An optical module, comprising a light source assembly and the optical element according to claim 1, the light source assembly being assigned to the light incident section of the optical element.

12. The optical module according to claim 11, wherein the optical element further comprises a control device capable of selectively triggering the light source assembly.

13. The optical module according to claim 12, wherein the light incident section has a first light incident region and a second light incident region, the light source assembly comprises a first light source combination and a second light source combination correspondingly assigned to the first light incident region and the second light incident region.

14. The optical module according to claim 13, wherein the light source combinations of the light source assembly are arranged on a common holder.

15. A vehicle having an optical module according to claim 11.

16. The optical element according to claim 1, wherein the optical element has a sub-region for generating a light distribution different from the low beam distribution and the high beam distribution.

17. The optical element according to claim 1, wherein the optical element is made of a light guide material made of polycarbonate, polymethyl methacrylate, silicone, silica gel or glass.

* * * * *